April 3, 1928.  1,665,124

E. WRIGHT

PROPAGATING BOX

Filed Jan. 25. 1926

Ernest Wright
INVENTOR

BY Victor J. Evans
ATTORNEY

Patented Apr. 3, 1928.

1,665,124

UNITED STATES PATENT OFFICE.

ERNEST WRIGHT, OF ARCH CREEK, FLORIDA.

PROPAGATING BOX.

Application filed January 25, 1926. Serial No. 83,666.

This invention relates to improvements in propagating boxes, the general object being a water tight container within which it may be supported for irrigation and having one side hingedly secured to permit the plants to be readily and easily removed therefrom without disturbing the adjacent plants.

Another object of my invention resides in the provision of supporting legs upon the perforated bottom of the propagating box for supporting the said box at an appropriate level within the container whereby a desired amount of water may be fed to the soil adjacent the roots of the plants within the box.

With the above and other objects in view, the invention further includes the following novel features and details of construction, to be hereinafter more fully described, illustrated in the accompanying drawing and pointed out in the appended claim.

In the drawing:—

Figure 1:
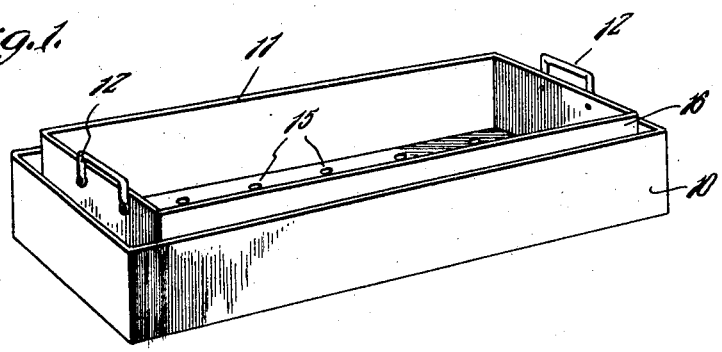
Figure 1 is a perspective view of my invention.
Figure 2:
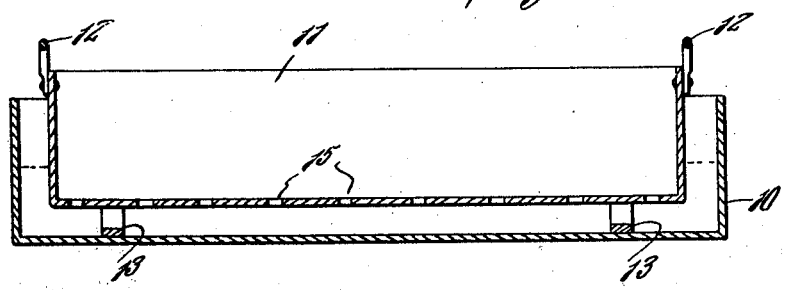
Figure 2 is a longitudinal sectional view thereof.

Referring to the drawing in detail, wherein like characters of reference denote corresponding parts, the reference character 10 indicates an elongated container being filled to an appropriate level with a quantity of water and adapted to receive therein a propagating box 11 having its respective ends arranged in slight spaced relation with respect to the corresponding ends of the container as clearly illustrated in Figures 1 and 2 of the drawing. The box 11 has handles 12 provided upon its opposite ends to permit its removal when necessary. The box 11 has substantially U-shaped transversely disposed supporting bars or legs 13 terminating in outwardly extending offset end portions 14 secured to the bottom thereof in order that the same may be supported at an appropriate height within the container 10 and which further includes a plurality of openings 15 within the bottom thereof to permit the water within the container to pass upwardly therethrough for the irrigation of the soil adjacent the roots of the plants within the box 11.

Figure 3:
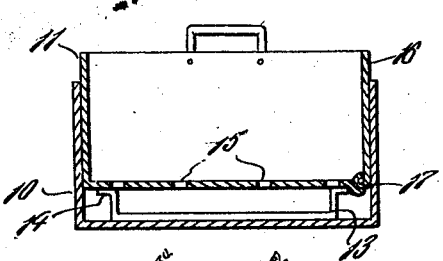
Figure 3 is a transverse section of the apparatus when in use.
Figure 4:
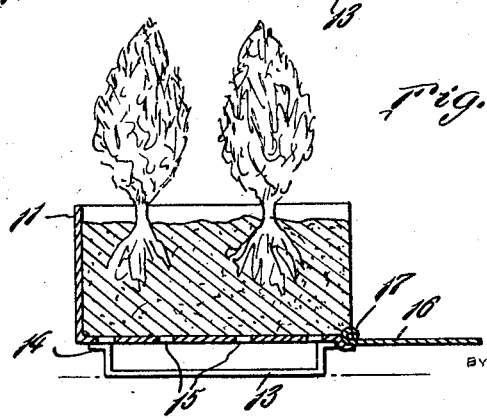
Figure 4 is a similar view of the propagating box per se with one side open to permit access to the plants to facilitate their removal.

One side 16 of the box 11 has its lower edge hingedly secured as indicated at 17 to the bottom thereof and normally held in an upright position against the adjacent side of the container 10, as clearly illustrated in Figure 3 of the drawing, and when removed as a whole from such container it will fall down in the position as clearly illustrated in Figure 4 of the drawing to permit the soil to be cut about the roots of the plants for placing the same within flower pots and the like or removed as a whole for transplanting. Obviously the invention may be utilized as a window box in its entirety, the space between the respective ends of the container 10 and box 11 permitting the circulation of air between the same whereby the water may not become stagnant.

The invention is susceptible of various changes in its form, proportions and minor details of construction, and the right is herein reserved to make such changes as properly fall within the scope of the appended claim.

Having thus described the invention, what is claimed is:—

A propagating box, a liquid level container therefor, substantially U-shaped supporting legs carried upon the bottom of the box to elevate the same to an appropriate height within the container, and a side member hingedly mounted upon the box adapted to permit transplanting of the contents thereof.

In testimony whereof I affix my signature.

ERNEST WRIGHT.